July 29, 1958     H. K. GARNER ET AL     2,845,404
INTERNALLY PLASTICIZED POLYMERS OF VINYL CHLORIDE
Filed April 28, 1955
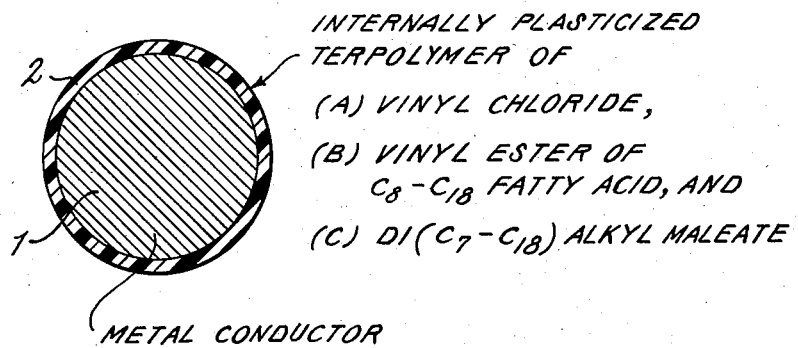
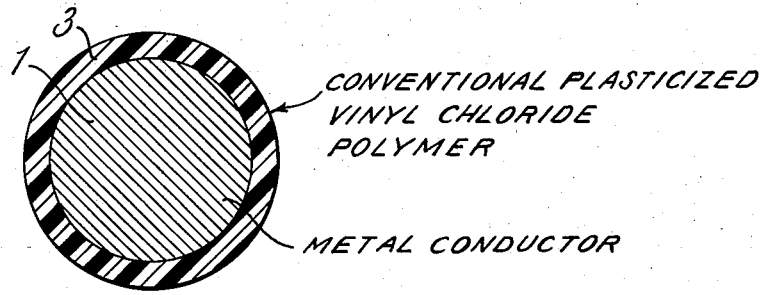
INVENTORS
HAROLD K. GARNER
HUBERT F. JORDAN
WENDELL V. SMITH
BY
Robert J. Patterson
ATTORNEY

United States Patent Office

2,845,404
Patented July 29, 1958

2,845,404
INTERNALLY PLASTICIZED POLYMERS OF VINYL CHLORIDE

Harold K. Garner, Packanack Lake, and Hubert F. Jordan and Wendell V. Smith, Nutley, N. J., assignors to United States Rubber Company, New York, N. Y., a corporation of New Jersey Application April 28, 1955, Serial No. 504,598

14 Claims. (Cl. 260—78.5)

This invention is concerned with novel internally plasticized polymers of vinyl chloride, with a novel method of making same, and with electrical conductors insulated with these novel polymers.

Polyvinyl chloride, when used for unsupported film, calendering onto cloth, extruding onto electrical conductors, and other applications where flexibility is desired, must be plasticized. The most commonly used plasticizers are dioctyl phthalate, dicapryl phthalate, and similar materials. Liquid polymeric plasticizers of somewhat higher molecular weight are also used. The monomeric plasticizers have the disadvantage that they tend to be lost as the articles age. Thus the material becomes stiff and unusable, and other products in contact with it, such as leather or lacquers, are often stained. The polymeric plasticizers are somewhat better in this respect, but they are not completely satisfactory. It would be desirable to have a polyvinyl chloride in which the plasticizer molecules are chemically bound in the polymer chains. Our invention provides such a material.

In the accompanying drawing:

Fig. 1 portrays in section an insulated conductor of our invention, and

Fig. 2 portrays in section an insulated conductor made with a conventional plasticized vinyl resin composition, showing qualitatively how much thicker the insulation must be to give equivalent electrical properties.

Conventional wire insulating compounds based on polyvinyl chloride and vinyl chloride-vinyl acetate copolymers are necessarily compounded with plasticizers to impart flexibility to the insulation and give suitable processing characteristics. Increasing increments of plasticizer progressively lower the insulation resistance value of the insulating composition. Attempts at reducing the plasticizer to improve electrical insulating properties have resulted in increased processing difficulties and reduced flexibility. Use of plasticizers also impairs the aging of these compounds since plasticizer volatilizes on aging leaving the compound brittle or less flexible. Plasticizers are also subject to extraction by water, oil and various chemicals with resultant embrittlement of the insulation.

Our invention involves interpolymerization of vinyl chloride with vinyl esters of higher fatty acids, which acids have 8–18 carbon atoms per molecule and with dialkyl maleic esters having 7–18 carbon atoms in each alkyl group, whereby novel terpolymers (tripolymers or ternary copolymers as distinguished from binary copolymers) are produced. The preferred vinyl ester is vinyl stearate, while the preferred maleic esters are those containing 10–14 carbon atoms in each alkyl group, and in particular the ester prepared from commercial lauryl alcohol (e. g., Du Pont's "Lorol 5" or "Lorol 9"). Material prepared in this fashion is referred to hereafter as dilauryl maleate, although the actual composition is a mixture of dialkyl maleates containing from 10–14 carbon atoms in the alkyl groups rather than solely the 12-carbon groups of pure dilauryl maleate. The term "dilauryl maleate" as used in the claims denotes either pure dilauryl maleate or the maleate prepared from commercial lauryl alcohol.

Terpolymers prepared from vinyl chloride, vinyl esters of fatty acids lower than $C_8$, and maleates prepared from fatty alcohols lower than $C_7$ are softer and have a lower melting point than unplasticized polyvinyl chloride. They are workable on conventional plastics-processing equipment at a lower temperature than polyvinyl chloride. However, they cannot be made to approach plasticized polyvinyl chloride in softness while retaining comparable strength. In contrast, our terpolymers exhibit strength comparable with that of plasticized polyvinyl chloride.

In general, polymerizable ester comonomers containing longer chains in the ester group have more effect as internal plasticizers than have the shorter-chained esters. A step-wise increase in length of carbon chain for ester comonomer will give a corresponding increase in effectiveness as internal plasticizer, culminating in the preferred comonomer esters of this invention which give a terpolymer having a high degree of internal plasticization and requiring little or no addition of conventional plasticizer.

Our terpolymers containing relatively large amounts of vinyl chloride and minor portions of the other two monomers (e. g. 95% vinyl chloride and 5% of the mixed comonomers) are characterized by properties similar to those of conventional rigid (containing little or no plasticizer) polyvinyl chloride with the additional advantage of greater ease in processing. Our terpolymers containing approximately equal amounts of vinyl chloride and mixed comonomers (e. g., 50% vinyl chloride and 50% mixed comonomers) are characterized by softness, tackiness, and other properties common to plasticized polyvinyl chloride containing high amounts of migratory plasticizers, but have the additional advantage that they do not contain any migratory plasticizer. Ratios of vinyl chloride and ester comonomers that fall between the ratios given above will produce terpolymers that are intermediate in properties. The examples to be shown hereinafter will illustrate in detail the effect of changes in ratios on the physical properties of the finished product.

In practicing our invention, we form our thermoplastic resinous terpolymers from a monomeric mixture containing at least 50% of monomeric vinyl chloride. Typically the balance of the monomeric mixture is made up of the vinyl ester and the dialkyl maleate in a ratio of from 15:1 to 1:15. We prefer to employ a monomeric mixture containing from 60 to 90% of vinyl chloride, the balance of the monomeric mixture being made up of the vinyl ester and the dialkyl maleate in a ratio of from 5:1 to 1:2. We have obtained outstanding results with a terpolymer made from a monomeric mixture containing approximately 80% vinyl chloride, the balance being made up of vinyl stearate and dilauryl maleate in a ratio of approximately 3:1. As will be obvious to those skilled in the art, the relative proportions in which the three monomers are combined in the terpolymer product often vary slightly from the relative proportions in which the monomers are present in the monomeric charge. Those skilled in the art can readily obtain our novel terpolymers by employing monomeric mixtures containing the three monomers in the relative proportions indicated in the foregoing and by following the present specification.

Another aspect of our invention is the novel method of preparing our new terpolymers. According to prior art practice, binary copolymers of vinyl chloride with vinyl esters or lower alkyl maleate esters are usually made in emulsion systems. However, when higher alkyl maleates ($C_8$ or higher alkyl) are used, they will not enter polymers in conventional emulsion polymerization systems and when $C_7$ dialkyl maleates are used they enter to an extent equal to only about one-half that achieved with the $C_6$ dialkyl maleates. Attempts to prepare our terpolymers of vinyl chloride, vinyl esters of $C_8$ or higher fatty acids and $C_7$ or higher alkyl maleates by emulsion polymerization yield only simple polyvinyl chloride or a simple binary copolymer of vinyl chloride and the vinyl ester, neither containing any maleate. This results from the extremely low rate of diffusion of the maleate through the water used as a dispersal medium. The maleate cannot reach the polymerization sites.

Conventional suspension (including bead and pearl) polymerization techniques (which are distinctly different from emulsion polymerization techniques), when modified according to our invention in the manner presently to be described, will yield terpolymers of vinyl chloride and the two comonomers described above having a predictable and accurately reproducible composition. Thus our method enables one to make a terpolymer having the three comonomers combined therein in definite pre-selected proportions. Ordinary procedures for loading reaction vessels often result in uneven distribution of the maleate ester and the catalyst through the dispersed monomer phase. Since mechanical exchange between droplets within the dispersion is apparently not extensive, this non-uniformity often persists through to the final polymer resulting in a mixture of polymer species, in rough processing and in non-reproducibility of results.

We have discovered, and this is a very important aspect of our invention, that the above mentioned difficulties (encountered both with conventional suspension systems and to an even greater extent with emulsion systems) can be readily overcome by making our terpolymers by suspension polymerization performed according to the following directions:

(1) Charge all the oil-soluble materials (i. e., the vinyl chloride, the vinyl ester, the dialkyl maleate and the oil-soluble catalyst) into one vessel;

(2) Charge all the water-soluble materials (i. e., the dispersing agents and the buffer) together with the water into a second vessel;

(3) Agitate the contents of the two vessels individually until a homogeneous solution is obtained in each;

(4) Mix the contents of the two vessels one into the other;

(5) Proceed with polymerization as in normal suspension polymerization methods, followed by conventional filtering, washing and drying operations.

The procedure just described absolutely insures that the catalyst and monomers, i. e. the oil-solubles, are formed into a single homogeneous phase before dispersal in the aqueous phase. This insures that the dispersal gives droplets of identical composition and that these will give polymer particles of identical composition.

Although we prefer to follow the procedure outlined above, we can, if desired, reserve the addition of all or part of the vinyl chloride monomer, which is readily diffusible through water, until after the single-phase, uniform, oil-soluble solution has been dispersed in the aqueous phase. Also, if desired, we can add additional water-soluble material to the dispersion. The essential point is to get a dispersion of a homogeneous phase of the oil-soluble material in the aqueous phase before polymerization starts.

It is necessary that at least part of the monomeric vinyl chloride be present in the mixture initially for the desired terpolymer to be formed. If desired, a minor proportion of the monomeric vinyl chloride can be added after initiation of the suspension polymerization.

All of the terpolymers of the example below, excepting runs C and D of Example I, were prepared by the conventional suspension technique and were excellent materials except that in some cases (notably runs A and B of Example I) they exhibited rough processing characteristics. In contrast, terpolymers prepared by our preferred method are reproducibly comparable to the best terpolymers made by the conventional method.

Our novel method insures complete reproducibility of product characteristics whereas conventional suspension polymerization techniques give erratic results as far as properties of product are concerned.

Our novel suspension polymerization method utilizes conventional suspending ingredients, conventional catalysts and conventional buffers. We can use any suspending agents known to the art such as gelatin, polyvinyl alcohol, water-soluble cellulose ethers, etc. Part of the suspending system may consist of small amounts of such emulsifiers as sodium lauryl sulfate, sodium laurate, or any of the commonly used emulsifiers. The use of such emulsifiers leads to a finer bead structure.

We can use any of the oil-soluble free radical polymerization catalysts known to the art, such as organic peroxides, e. g. benzoyl peroxide and lauroyl peroxide, azo-type catalysts such as azo-bis-isobutyronitrile, etc.

We can use any neutral to slightly basic buffer, such as disodium hydrogen phosphate, sodium tetraphosphate or a sodium carbonate-bicarbonate mixture. The use of buffer is not essential.

Our novel terpolymers are useful generally wherever plasticized or unplasticized polyvinyl chloride may be used. They are especially useful as insulating coatings in direct contact with electrical conductors where they exhibit many advantages over conventional polyvinyl chloride insulation. They can be extruded onto metal wire (e. g. of copper) in conventional extruding equipment yielding an insulated wire having phenomenal electrical properties compared to wire insulated with ordinary polyvinyl chloride compounds. At the same time the physical and mechanical properties of our insulated wire, including impact-resistance, resistance to heat distortion, flexibility at low temperatures (as measured by the cold bend test), etc. are excellent. The phenomenal electrical properties and the excellent physical properties of our insulated wire are retained over extremely long periods of exposure to normally adverse influences such as light, ozone, weather, water, etc. Even when our terpolymers contain no conventional stabilizer, they exhibit these remarkable aging characteristics, being much better in this respect than unstabilized polyvinyl chloride.

The processing characteristics of our terpolymers are in general comparable to those of polyvinyl chloride compounds of similar flexibility so that they can be readily extruded, calendered or molded and in general used in any of the applications in which polyvinyl chloride is satisfactory.

In applying our novel terpolymers to wire by extruding, we admix them with any desired compounding materials such as pigments and fillers, and stabilizers if desired, and extrude them directly onto the wire. We prefer to add no extraneous plasticizer during the compounding. We can, if desired, add a small amount, say up to 5% by weight based on the terpolymer, of extraneous plasticizer but it greatly impairs the electrical properties although they may still be good enough for some uses. For example, use of 5% of added plasticizer cuts the electrical resistivity about in half, although the resistivity is still good. Other properties, such as resistance to heat distortion, tensile strength, and resistance to prolonged contact with water may be similarly impaired by the use of 5% of plasticizer although they may still be good enough for certain uses where the extremely high quality of our unplasticized terpolymers is not required.

We prefer to apply our novel terpolymers to the electrical wire to be insulated therewith by extrusion so as to form a continuous layer of the terpolymer over the entire surface of the wire. We can also apply our terpolymers to the wire in other ways, for example by forming the terpolymers into a tape and wrapping this tape around the wire. This method is more costly and, unlike the extrusion method, does not give a continuous uninterrupted layer of uniform thickness over the entire surface.

The following examples will illustrate in detail the preparation of our copolymers, and the advantages of our new method of preparation of the terpolymers, and the improvement in the terpolymers themselves over material of the prior art.

EXAMPLE I

Four runs were made in preparation of a terpolymer, two (A and B) using conventional methods, and two (C and D) using the method of our invention. All four runs used the following formulation:

|  | Parts by weight |
|---|---|
| (1) Water | 320 |
| (2) Vinyl chloride | 80 |
| (3) Dilauryl maleate | 5 |
| (4) Vinyl stearate | 15 |
| (5) Gelatin | 0.5 |
| (6) Lauroyl peroxide ("Alperox-C") | 0.4 |
| (7) Sodium tetraphosphate ("Quadrafos") | 0.2 |
| (8) Sodium lauryl sulfate ("Aquarex ME") | 0.05 |

Runs A and B were polymerized as follows:

The water and the water-soluble materials (items 5, 7 and 8) were added to a 750-cc. bomb, the water-solubles being added as solutions. The bomb was then flushed with nitrogen and frozen. Dilauryl maleate, with the lauroyl peroxide dissolved in it, and the vinyl stearate were then added. Finally, the vinyl chloride was added as a liquid and the bomb closed with a crown cap. The bomb was then placed in a 50° C. shaking bath for 20 hours. At the end of the 20-hour polymerization period the vinyl chloride pressure was 49 p. s. i. in both run A and run B. The bombs were then removed and excess pressure was vented off, the polymer was filtered off and air dried. Fifty grams of the dried polymer were compounded with 10 grams of dioctyl phthalate and 1 gram of calcium stearate. This mixture was milled for 10 minutes at 270° F. and sheeted off.

Runs C and D, were prepared according to the method of our invention as follows:

A 750-cc. bomb was loaded with the water and water-soluble materials and flushed with nitrogen. The water-solubles (items 5, 7 and 8) were added as solutions. The nitrogen was flushed out with a small portion of vinyl chloride and the bomb was capped. Any vinyl chloride pressure was removed by venting.

A 250-cc. bomb was loaded with the lauroyl peroxide, the dilauryl maleate, and the vinyl stearate. The vinyl chloride was added and the bomb was capped. The bomb and contents were then shaken for 5 minutes at 50° C. to insure a homogeneous solution. The solution in the 250-cc. bomb was then transferred into the 750-cc. bomb, and polymerization was carried out as in runs A and B.

The materials obtained from the four runs, while prepared from the same recipe, were quite different in appearance and in processing. The materials from runs A and B were rough and nervy on the mill, giving a sheeted material that shrank extensively when removed from the mill and was of a rough, leathery appearance, although very tough. The material also showed some evidence of variation in composition by presence of "fish eyes." Its physical and electrical properties were excellent.

In contrast, the materials from runs C and D were smooth processing with little or no surface roughness and with essentially no shrinkage on removal from the mill. The material was very smooth and had a good hand. No evidence of variation in composition ("fish eyes") was observed.

We have repeatedly demonstrated that the method of our invention, as exemplified in runs C and D, consistently gives a satisfactory terpolymer with good processing characteristics and freedom from non-uniformity. In contrast, the method of runs A and B is almost completely unpredictable as to the quality of the product produced.

The above example demonstrates the advantages in using the method of preparation according to the new invention, giving a more easily processible and better appearing material.

EXAMPLE II

Four terpolymers of our invention were prepared by the method used in runs A and B of Example I, showing the effects of varying the relative proportions of the three monomers in the original charge. The proportions in which the monomers are combined in the terpolymer approximate the proportions in the initial charge. The proportions used in making the four terpolymers, and the 100% modulus and Shore A durometer hardness values for the four terpolymers, were as follows:

Table 1

| Run | Monomer Feed | | | Parts Dioctyl Phthalate | 100% Modulus (R. T.) | Shore A Durometer (R. T.) |
|---|---|---|---|---|---|---|
|  | Parts Vinyl Chloride | Parts Vinyl Stearate | Parts Dilauryl Maleate |  |  |  |
| E | 80 | 10 | 10 | 20 | 730 | 61 |
| F | 70 | 15 | 15 |  | 590 | 76 |
| G | 60 | 20 | 20 |  | 300 | 46 |
| H | 50 | 25 | 25 |  | 50 | 16 |

Runs E to H demonstrate the changes that take place in our terpolymers when the ratio between the vinyl chloride and the mixed comonomers is changed. The terpolymer of run E is a stiff, board-like material that requires 20 parts of plasticizer in order to give it properties similar to those of the terpolymer of run F, which has 10 parts less of vinyl chloride in the monomer feed and contains no plasticizer.

As the ratio of vinyl chloride to the mixed monomers in the monomer feed approaches 1:1, the terpolymer becomes softer, as may be readily seen by examination of the physical properties given in Table I.

EXAMPLE III

Five polymers (runs J to N in Table II below) were prepared, using the method of runs A and B of Example I. Runs J and N were binary copolymers included for comparison. Run I was a commercial polyvinyl chloride preparation (based on "Marvinol VR-21"), also included for comparison. The data were as follows:

Table II

| Run | Monomer Feed | | | Parts Dioctyl Phthalate | Torsional Modulus (−30° C.) | 100% Modulus (R. T.) | Tensile (180° F.) |
|---|---|---|---|---|---|---|---|
|  | Parts Vinyl Chloride | Parts Vinyl Stearate | Parts Dilauryl Maleate |  |  |  |  |
| I | 100 |  |  | 50 | 211,000 | 975 | 506 |
| J | 80 |  | 20 | 20 | 191,000 | 610 | 214 |
| K | 80 | 5 | 15 | 20 | 169,000 | 675 | 234 |
| L | 80 | 10 | 10 | 20 | 152,500 | 600 | 171 |
| M | 80 | 15 | 5 | 20 | 159,000 | 525 | 152 |
| N | 80 | 20 |  | 20 | 188,000 | 500 | 62 |

Runs I to N demonstrate that the terpolymers of our invention (runs K, L, M) have better low temperature properties than the binary copolymers (J and N), and also better high temperature properties than the vinyl stearate/vinyl chloride copolymer (N). Also, it may be seen that the polyvinyl chloride (I) has 2.5 times as much plasticizer as the internally plasticized terpolymers, and yet has a higher room temperature modulus.

EXAMPLE IV

The polymers listed in Table III were compared. Run O was a commercial polyvinyl chloride preparation, like run I of Example III. Runs P and Q were binary copolymers. Runs P to S were prepared by the method of runs A and B of Example I.

Table III

| Run | Monomer Feed | | | Parts Dioctyl Phthalate | Final Length (cm.) | Percent Shrinkage |
|---|---|---|---|---|---|---|
| | Parts Vinyl Chloride | Parts Vinyl Stearate | Parts Dilauryl Maleate | | | |
| O | 100 | | | 50 | 23.4 | 2 |
| P | 80 | | 20 | 20 | 20.1 | 16 |
| Q | 70 | | 30 | | 17.0 | 29 |
| R | 70 | 20 | 10 | | 20.4 | 15 |
| S | 80 | 15 | 5 | 20 | 22.3 | 7 |

50-gm. samples of materials of composition as indicated in Table III were milled until homogeneous and banded around one 3-inch roll. The second roll was backed off slowly until the bank disappeared. Sock was then removed without stretching, the initial length being 23.87 cm., and final dimensions were taken after shrinkage. The final lengths are indicated in Table III. The change in length of the material may be taken as an indication of its "nerve."

Examination of the data in Table III indicates that each terpolymer has much less "nerve" than the corresponding binary copolymer containing the same amount of vinyl chloride, and terpolymer S closely approaches the highly plasticized polyvinyl chloride. Accordingly, it will be seen that the terpolymers of our invention have non-migratory plasticization and yet are easily processible.

Run P, a binary copolymer, should properly be compared with run S, a terpolymer. Both of these examples are polymers containing 80 parts of vinyl chloride and 20 parts of plasticizer. Comparison of these two indicates the percent shrinkage of the copolymer (P) is more than twice that of the terpolymer (S). Binary copolymer Q may be compared with terpolymer R, which indicates again an approximate shrinkage in the binary copolymer almost twice that of the terpolymer.

It is obvious from the comparisons of the previous paragraph that the terpolymers exhibit much less "nerve" than the corresponding binary terpolymers, and therefore have greatly improved processing properties over those of the binary copolymers.

EXAMPLE V

When vinyl chloride/vinyl stearate copolymers were prepared with 30% vinyl stearate, a polymer was obtained that developed a very serious bloom which was identified as vinyl stearate. Also, the material, initially quite flexible, became quite stiff upon standing.

In comparison, a terpolymer of our invention, containing 70% vinyl chloride, 15% vinyl stearate, and 15% dilauryl maleate, did not show evidence of bloom, and remained flexible and clear.

EXAMPLE VI

Using the method of runs A and B of Example I the following terpolymers were prepared from a feed containing:

70 parts vinyl chloride
20 parts vinyl stearate
10 parts maleate ester

The data were as follows:

Table IV

| Run | Maleate Ester | Torsional Modulus at +25° C. | Torsional Modulus at −30° C. |
|---|---|---|---|
| T | Dilauryl | 7,030 | 236,000 |
| U | Di-2-ethylhexyl | 25,200 | 268,000 |

Table IV shows that use of even a $C_8$ dialkyl maleate results in a terpolymer which is much stiffer and more rigid than that from the $C_{12}$ maleate.

EXAMPLE VII

Using the method of runs A and B of Example I for runs W and X, the polymer compositions shown in Table V were prepared. The polyvinyl chloride used in run V was a special electrical grade material ("Geon 101") used in order to give a valid comparison of electrical properties.

Table V

| Run | Parts Vinyl Chloride | Parts Vinyl Stearate | Parts Dilauryl Maleate | Parts Dioctyl Phthalate | Parts Clay | Parts Lead Carbonate | Parts Lead Stearate | Volume Resistivity (Ohm-Centimeters) |
|---|---|---|---|---|---|---|---|---|
| V | 100 | | | 50 | 1.6 | 2.0 | 0.1 | $1.59 \times 10^{14}$ |
| W | 70 | 20 | 10 | | 1.6 | 2.0 | 0.1 | $38 \times 10^{14}$ |
| X | 70 | 20 | 10 | | 1.6 | 2.0 | 0.1 | $33 \times 10^{14}$ |

The data in Table V illustrate the advantage in resistivity that the internally plasticized terpolymers have over electrical grade polyvinyl chloride compounded with plasticizer as commonly is done by previous methods.

EXAMPLE VIII

In addition to the 20 to 25 times greater resistivity shown above, insulation resistance values in water at 50° C. over extended immersion periods are vastly superior to conventional plasticized polyvinyl chloride insulations, as shown by this example.

The following compositions were prepared in the conventional way and were extruded onto wire using conventional extruding technique, forming insulation 1/32" thick. The terpolymers used in runs AA, BB, CC and DD were made by the method of runs A and B of Example I.

COMPOSITIONS AA AND BB

| | Parts |
|---|---|
| Terpolymer resin | 100 |
| Stabilizer (e. g. "Tribase" (tribasic lead sulfate)) | 8 |

COMPOSITIONS CC AND DD

| | |
|---|---|
| Terpolymer resin | 100 |
| Stabilizer (e. g. "Tribase" (tribasic lead sulfate)) | 8 |
| Plasticizer (e. g. di-2-ethyl hexyl phthalate) | 5 |
| Filler (e. g. "Pigment #33" (electrical grade clay)) | 15 |

COMPOSITION EE

| | |
|---|---|
| Electrical grade polyvinyl chloride | 100 |
| Stabilizer (e. g. "Tribase" (tribasic lead sulfate)) | 8 |
| Plasticizer (e. g. di-2-ethyl hexyl phthalate) | 60 |
| Filler (e. g. "Pigment #33" (electrical grade clay.)) | 15 |

The resulting insulated wires were tested by the standard water immersion test used for determining insulation resistance upon aging under water. The data were as shown in the following Table VI.

*Table VI.—Insulation resistance in water #14 AWG, 1/32" insulation megohms/1000'*

| Monomer Feed VC-VS-DLM | Composition | 16 hrs. at R. T. | 1 wk. at 50° C. | 3 wks. at 50° C. | 6 wks. at 50° C. |
|---|---|---|---|---|---|
| 80-15-5 | AA | 13,500 | 3,300 | 4,900 | 8,850 |
|  |  | 10,000 | 3,120 | 6,850 | 8,550 |
| 70-20-10 | BB | 6,750 | 482 | 980 | 1,310 |
|  |  | 4,650 | 465 | 915 | 1,110 |
| 80-15-5 | CC | 5,400 | 2,100 | 2,450 | 2,680 |
|  |  | 4,500 | 2,080 | 2,500 | 3,440 |
| 70-20-10 | DD | 3,720 | 1,150 | 1,380 | 1,260 |
|  |  | 3,520 | 1,060 | 1,450 | 1,330 |
| Typical Plasticized Flexible polyvinyl chloride Insulation | EE | 2,050 | 9.8 | 20.7 | 25.7 |

From the data just given it will be seen that wire insulation based upon our novel terpolymers is outstandingly superior to wire insulation based on conventional plasticized polyvinyl chloride. The contrast is striking and detailed comment is unnecessary. Present commercial vinyl chloride type wire extrusion compounds all require substantial amounts of external plasticizer. In contrast in compositions AA, BB, CC, and DD, based on our terpolymers, either no extraneous plasticizer is used or the amount thereof is very small. Therefore, there is little or no possibility for migration or volatilization of plasticizer in compositions based upon our new terpolymers, and so there is a corresponding improvement in aging characteristics.

By employing our terpolymers as wire insulation it is possible, because of their superlative electrical properties, to materially reduce the thickness of the insulation and thereby enable the use of our insulated wire in cables where the bulk of conventional vinyl resin insulation would preclude its use.

In Fig. 1 of the drawing, a metallic conductor 1 is shown as insulated with a layer 2 of the terpolymer of our invention. In Fig. 2, for comparison there is shown the same conductor insulated with a layer 3 of conventional plasticized vinyl chloride polymer. The much greater thickness of layer 3 in comparison to layer 2 emphasizes the insulating superiority of our terpolymers.

The two alkyl groups in the dialkyl maleates used in practicing our invention can be the same or can be different (either in number or in arrangement of carbon atoms). An example of dialkyl maleate wherein a substantial proportion of molecules undoubtedly embody different alkyl groups is that made from commercial lauryl alcohol which is a mixture of $C_{10}$ to $C_{14}$ alcohols. Another example is that made from commercial tridecyl alcohol, which is a mixture of isomeric tridecyl alcohols made by the "Oxo" process.

All percentages, proportions and ratios specified herein and in the claims are by weight.

Having thus described our invention, what we claim and desire to protect by Letters Patent is:

1. A thermoplastic resinous terpolymer of vinyl chloride, a vinyl ester of a saturated aliphatic monocarboxylic acid, said acid having from 8 to 18 carbon atoms per molecule, and a dialkyl maleate having from 7 to 18 carbon atoms in each alkyl group, said terpolymer being formed from a monomeric mixture containing from 50 to 95% of vinyl chloride, the balance of said monomeric mixture being made up of said vinyl ester and said dialkyl maleate in a ratio of from 15:1 to 1:15.

2. A thermoplastic resinous terpolymer of vinyl chloride, a vinyl ester of a saturated aliphatic monocarboxylic acid, said acid having from 8 to 18 carbon atoms per molecule, and a dialkyl maleate having from 7 to 18 carbon atoms in each alkyl group, said terpolymer being formed from a monomeric mixture containing from 60 to 90% of vinyl chloride, balance of said monomeric mixture being made up of said vinyl ester and said dialkyl maleate in a ratio of from 5:1 to 1:2.

3. A thermoplastic resinous terpolymer of vinyl chloride, vinyl stearate and dilauryl maleate, said terpolymer being formed from a monomeric mixture containing from 50 to 95% of vinyl chloride, the balance of said monomeric mixture being made up of said vinyl stearate and said dilauryl maleate in a ratio of from 15:1 to 1:15.

4. A thermoplastic resinous terpolymer of vinyl chloride, vinyl stearate and dilauryl maleate, said terpolymer being formed from a monomeric mixture containing from 60 to 90% of vinyl chloride, the balance of said monomeric mixture being made up of said vinyl stearate and said dilauryl maleate in a ratio of from 5:1 to 1:2.

5. A thermoplastic resinous terpolymer of vinyl chloride, vinyl stearate and dilauryl maleate, said terpolymer being formed from a monomeric mixture containing approximately 80% of vinyl chloride, the balance of said monomeric mixture being made up of said vinyl stearate and said dilauryl maleate in a ratio of approximately 3:1.

6. A metallic electrical conductor insulated with a layer of a thermoplastic resinous terpolymer of vinyl chloride, vinyl stearate and dilauryl maleate, said terpolymer being formed from a monomeric mixture containing approximately 80% of vinyl chloride, the balance of said monomeric mixture being made up of vinyl stearate and dilauryl maleate in a ratio of approximately 3:1.

7. The method of making a thermoplastic resinous terpolymer of vinyl chloride, a vinyl ester of a saturated aliphatic monocarboxylic acid, said acid having from 8 to 18 carbon atoms per molecule, and a dialkyl maleate having from 7 to 18 carbon atoms in each alkyl group, which comprises subjecting a monomeric mixture of vinyl chloride, said vinyl ester and said dialkyl maleate, said monomeric mixture containing from 50 to 95% of monomeric vinyl chloride, the balance of the monomers being made up of the monomeric vinyl ester and the monomeric dialkyl maleate in a ratio of from 15:1 to 1:15, to suspension polymerization in an aqueous medium in the presence of a water soluble suspension agent and an oil soluble catalyst of free radical polymerization.

8. A method as set forth in claim 7 wherein said vinyl ester is vinyl stearate and said dialkyl maleate is dilauryl maleate and wherein the monomers subjected to suspension polymerization contain from 60 to 90% of vinyl chloride, the balance of the monomers being made up of the monomeric vinyl stearate and the monomeric dilauryl maleate in a ratio of from 5:1 to 1:2.

9. A method as set forth in claim 7 wherein said vinyl ester is vinyl stearate and said dialkyl maleate is dilauryl maleate and wherein the monomers subjected to suspension polymerization contain approximately 80% of vinyl chloride, the balance of the monomers being made up of vinyl stearate and dilauryl maleate in a ratio of approximately 3:1.

10. A metallic electrical conductor insulated with a layer of a thermoplastic resinous terpolymer of vinyl chloride, a vinyl ester of a saturated aliphatic monocarboxylic acid, said acid having from 8 to 18 carbon atoms per molecule, and a dialkyl maleate having from 7 to 18 carbon atoms in each alkyl group, said terpolymer being formed from a monomeric mixture containing from 50 to 95% of vinyl chloride, the balance of said monomeric mixture being made up of said vinyl ester and said dialkyl maleate in a ratio of from 15:1 to 1:15.

11. A metallic electrical conductor insulated with a layer of a thermoplastic resinous terpolymer of vinyl chloride, a vinyl ester of a saturated aliphatic monocarboxylic acid, said acid having from 8 to 18 carbon atoms per molecule, and a dialkyl maleate having from 7 to 18 carbon atoms in each alkyl group, said terpolymer being formed from a monomeric mixture containing from 60 to 90% of vinyl chloride, the balance of said monomeric mixture being made up of said vinyl ester and said dialkyl maleate in a ratio of from 5:1 to 1:2.

12. A metallic electrical conductor insulated with a layer of a terpolymer of vinyl chloride, vinyl stearate and dilauryl maleate, said terpolymer being formed from a monomeric mixture containing from 50 to 95% of vinyl chloride, the balance of said monomeric mixture being made up of said vinyl stearate and said dilauryl maleate in a ratio of from 15:1 to 1:15.

13. A metallic electrical conductor insulated with a layer of a terpolymer of vinyl chloride, vinyl stearate and dilauryl maleate, said terpolymer being formed from a monomeric mixture containing from 60 to 90% of vinyl chloride, the balance of said monomeric mixture being made up of said vinyl stearate and said dilauryl maleate in a ratio of from 5:1 to 1:2.

14. The method of making a thermoplastic resinous terpolymer of vinyl chloride, a vinyl ester of a saturated aliphatic monocarboxylic acid having from 8 to 18 carbon atoms per molecule, and a dialkyl maleate having from 7 to 18 carbon atoms in each alkyl group, which comprises forming a homogeneous solution of the monomeric vinyl ester, the monomeric dialkyl maleate and an oil-soluble catalyst of free radical polymerization, separately forming a homogeneous solution of water-soluble suspension agent and water, dispersing said first-named solution in said second-named solution to form a suspension of droplets of water-immiscible phase, all of which droplets are homogeneous and of identical composition, in the homogeneous phase, incorporating at least part of the monomeric vinyl chloride in the suspension prior to initiation of the polymerization step, subjecting the suspension to suspension polymerization, the monomers subjected to suspension polymerization containing from 50 to 95% of monomeric vinyl chloride, the balance of the monomers being made up of the monomeric vinyl ester and the monomeric dialkyl maleate in a ratio of from 15:1 to 1:15, and recovering from the resulting mixture a terpolymer of said vinyl chloride, said vinyl ester and said dialkyl maleate.

No references cited.